US006270876B1

(12) United States Patent
Abe et al.

(10) Patent No.: US 6,270,876 B1
(45) Date of Patent: Aug. 7, 2001

(54) CRYSTALLIZED GLASS, SUBSTRATE FOR MAGNETIC DISC, MAGNETIC DISC AND METHOD OF PRODUCING CRYSTALLIZED GLASS

(75) Inventors: Masahiro Abe; Takahiro Takahashi, both of Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/435,762

(22) Filed: Nov. 8, 1999

(30) Foreign Application Priority Data

Nov. 9, 1998 (JP) .................................................. 10-317268

(51) Int. Cl.⁷ ...................................................... G11B 5/82
(52) U.S. Cl. .................. 428/141; 428/65.3; 428/694 ST; 428/694 SG; 501/4; 501/5
(58) Field of Search .................................... 428/141, 64.1, 428/64.2, 64.3, 65.3, 694 ST, 694 SG; 501/4, 5

(56) References Cited

U.S. PATENT DOCUMENTS

| 5,391,522 | * | 2/1995 | Goto et al. ................................. 501/4 |
| 5,567,217 | * | 10/1996 | Goto et al. ............................. 65/33.1 |
| 5,580,363 | * | 12/1996 | Goto et al. ........................... 65/29.18 |
| 5,872,069 | * | 2/1999 | Abe ........................................... 501/5 |
| 6,034,011 | * | 3/2000 | Yamaguchi et al. ..................... 501/4 |
| 6,174,827 | * | 1/2001 | Goto et al. ................................. 501/4 |
| 6,191,058 | * | 2/2001 | Yamaguchi ............................... 501/4 |

FOREIGN PATENT DOCUMENTS

| 6-29152 | 4/1994 | (JP) . |
| 7-101750 | 4/1995 | (JP) . |
| 7-157331 | 6/1995 | (JP) . |
| 2516553 | 4/1996 | (JP) . |
| 2628460 | 4/1997 | (JP) . |
| 10-208226 | 8/1998 | (JP) . |
| 10-226532 | 8/1998 | (JP) . |

* cited by examiner

Primary Examiner—Stevan A. Resan
(74) Attorney, Agent, or Firm—Burr & Brown

(57) ABSTRACT

A crystallized glass has a main crystal phase of α-quartz ($SiO_2$) and lithium disilicate ($Li_2 \cdot 2SiO_2$) and has a thermal expansion coefficient of $(90~130) \times 10^{-7}$/K at $-50°$ C.~$70°$ C. The crystallized glass mentioned above, has a following chemical composition; 70 wt % $\leq SiO_2 \leq$ 80 wt %, 5 wt % $\leq Al_2O_3 \leq$ 9 wt %, 7 wt % $\leq Li_2O \leq$ 10 wt %, 1 wt % $\leq P_2O_5 \leq$ 3 wt %, 0 wt % $\leq K_2O \leq$ 3 wt %, 0 wt % $\leq CaO \leq$ 3 wt %, 0 wt % $\leq BaO \leq$ 4 wt %, 0 wt % $\leq ZnO \leq$ 4 wt %, 0 wt % $\leq Sb_2O_3 \leq$ 1 wt %, 0 wt % $\leq ZrO_2 \leq$ 6 wt %, 0 wt % $\leq Nb_2O_5 \leq$ 6 wt %, 0 wt % $\leq SnO_2 \leq$ 4 wt %, 0 wt % $\leq MoO_3 \leq$ 3 wt %, 0.7 wt % $\leq (Nb_2O_5+SnO_2+MoO_3) \leq$ 6 wt %.

6 Claims, 3 Drawing Sheets

CRYSTALLIZED GLASS, SUBSTRATE FOR MAGNETIC DISC, MAGNETIC DISC AND METHOD OF PRODUCING CRYSTALLIZED GLASS

BACKGROUND OF THE INVENTION

1. Field of the Invention

The present invention relates to a crystallized glass and a method of producing the same and also relates to a substrate for magnetic disc obtained by using the crystallized glass and a magnetic disc utilizing the substrate for magnetic disc.

2. Description of Related Art

In a field of magnetic disc substrate, a glass having a thermal expansion coefficient $((90 \sim 130) \times 10^{-7}/K)$ near that of SUS (for example thermal expansion coefficient of $105 \times 10^{-7}/K$) used for fixing the disc is required due to a problem of thermal off track. In an amorphous glass such as chemical strengthened glass, it is necessary to increase an amount of alkali metal oxide so as to make a thermal expansion coefficient thereof larger. As a result, since a weather resistance of the glass is deteriorated, it is difficult to make a thermal expansion coefficient at near room temperature to $(90 \sim 130) \times 10^{-7}/K$. In the crystallized glass, it is possible to make a thermal expansion coefficient at near room temperature to $(90 \sim 130) \times 10^{-7}/K$ by precipitating crystals having a larger thermal expansion coefficient.

Generally, a glass having a thermal expansion coefficient such as $(90 \sim 130) \times 10^{-7}/K$ at $25°$ C.$\sim 100°$ C. was required. However, recently a glass having a thermal expansion coefficient such as $(90 \sim 130) \times 10^{-7}/K$ at lower temperature range of $-50°$ C.$\sim 70°$ C. is required.

In Japanese Patent Publication No.6-29152 (JP-B-6-29152), a glass containing $P_2O_5$ and MgO as an essential ingredient, which has $\alpha$-cristobalite and lithium disilicate as a main crystal and $\alpha$-quartz and lithium metasilicate as a sub crystal, is disclosed. Since, in the glass mentioned above, cristobalite phase is precipitated as a main crystal, a variation of thermal expansion coefficient with respect to a crystallization temperature is low, but a particle size of crystal is large such as smaller than 1 $\mu$m. In Japanese Patent Nos. 2516553 and 2628460, a crystallized glass for magnetic disc having $\alpha$-quartz and lithium disilicate as a main crystal, in which $\alpha$-quartz is precipitated as a coagulation state having a diameter of 0.3 $\mu$m or more, is disclosed. In these disclosures, a stability of thermal expansion coefficient with respect to the crystallized temperature is not mentioned. Moreover, since $\alpha$-quartz is precipitated as a coagulation state, a surface roughness (Ra) after a precise polishing is large such as 5~15 angstroms.

In Japanese Patent Laid-Open Publication No. 10-226532 (JP-A-10-226532), a crystallized glass for magnetic disc having lithium disilicate as a main crystal and $\alpha$-quartz as a sub crystal is disclosed. In this disclosure, it is disclosed an example that a surface roughness after a precise polishing is 6.5 angstroms, but a particle size of crystal and a stability of thermal expansion coefficient with respect to the crystallized temperature are not mentioned. In Japanese Patent Laid-Open Publication No. 7-101750, a crystallized glass containing $P_2O_5$ and $TiO_2$ as an essential ingredient, which has $\alpha$-quartz and lithium disilicate as a main crystal, is disclosed. In this disclosure, it is described that a stability of thermal expansion coefficient with respect to the crystallized temperature is excellent, but it is not preferred for a magnetic disc due to its worse weather resistivity since there is a lithium metasilicate phase.

In Japanese Patent Laid-Open Publication No. 10-208226 (JP-A-10-208226), a crystallized glass containing $Nb_2O_5$, which has lithium disilicate and ($\alpha$-quartz as a main crystal, is disclosed. In this disclosure, an object of including $Nb_2O_5$ is to improve a light absorption when performing a laser texture working, and there is no description about a thermal expansion coefficient of the crystallized glass and a stability of thermal expansion coefficient. Moreover, it is disclosed that an amount of $Nb_2O_5$ is preferred to 0.01~0.5 wt %. In Japanese Patent Laid-Open Publication No.7-157331 (JP-A-7-157331), a crystallized glass containing molybdenum oxide and so on and showing Mansell value of 0~7, which has lithium disilicate and $\alpha$-quartz as a main crystal, is disclosed. In this disclosure, an object of including Mo and so on is to easily detect surface flaws. In this invention, it is possible to add molybdenum oxide up to 4 wt %, but, in this case, even if combining $Nb_2O_5$ and $SnO_2$, Mansell value showing a brihgtness is not smaller than 7.

SUMMARY OF THE INVENTION

An object of the present invention is to provide a crystallized glass used preferably for a magnetic disc having a lithium disilicate and a-quartz as a main crystal, in which a thermal expansion coefficient at $-50°$ C.$\sim 70°$ C. is $(90 \sim 130) \times 10^{-7}/K$ and a variation of thermal expansion coefficient is small.

According to the invention, a crystallized glass, which has a main crystal phase of $\alpha$-quartz ($SiO_2$) and lithium disilicate ($Li_2O \cdot 2SiO_2$) and has a thermal expansion coefficient of $(90 \sim 130) \times 10^{-7}/K$ at $-50°$ C.$\sim 70°$ C., comprises a following chemical composition, 70 wt %$\leq SiO_2 \leq$80 wt %, 5 wt %$\leq Al_2O_3 \leq$9 wt %, 7 wt %$\leq Li_2O \leq$10wt %, 1 wt %$\leq P_2O_5 \leq$3 wt %, 0 wt %$\leq K_2O \leq$3 wt %, 0 wt %$\leq CaO \leq$3 wt %, 0 wt %$\leq BaO \leq$4 wt %, 0 wt %$\leq ZnO \leq$4 wt %, 0 wt %$\leq Sb_2O_3 \leq$1 wt %, 0 wt %$\leq ZrO_2 \leq$6 wt %, 0 wt %$\leq Nb_2O_5 \leq$6 wt %, 0 wt %$\leq SnO_2 \leq$4 wt %, 0 wt %$\leq MoO_3 \leq$3 wt %, 0.7 wt %$\leq (Nb_2O_5 + \pm SnO_2 + MoO_3) \leq$6 wt %.

Moreover according to the invention, a substrate for magnetic disc, made of the crystallized glass mentioned above, comprises a smoothened surface having a center line average roughness (Ra) of smaller than 7 angstrom.

Further, according to the invention, a magnetic disc comprising the substrate for magnetic disc mentioned above, a underlying layer formed on the smoothened surface of the substrate for magnetic disc, and a metallic magnetic layer formed on the underlying layer.

Furthermore, according to the invention, a method of producing a crystallized glass comprises the steps of; preparing a parent glass having the chemical composition mentioned above, subjecting the parent glass to a heat treatment at $570°$ C.$\sim 640°$ C. preferably for 2~10 hours so as to perform a nucleus generation, and subjecting the parent glass to a heat treatment at $670°$ C.$\sim 750°$ C. preferably for 2~10 hours so as to crystallize the parent glass.

DESCRIPTION OF THE PREFERRED EMBODIMENT

Figure 1:
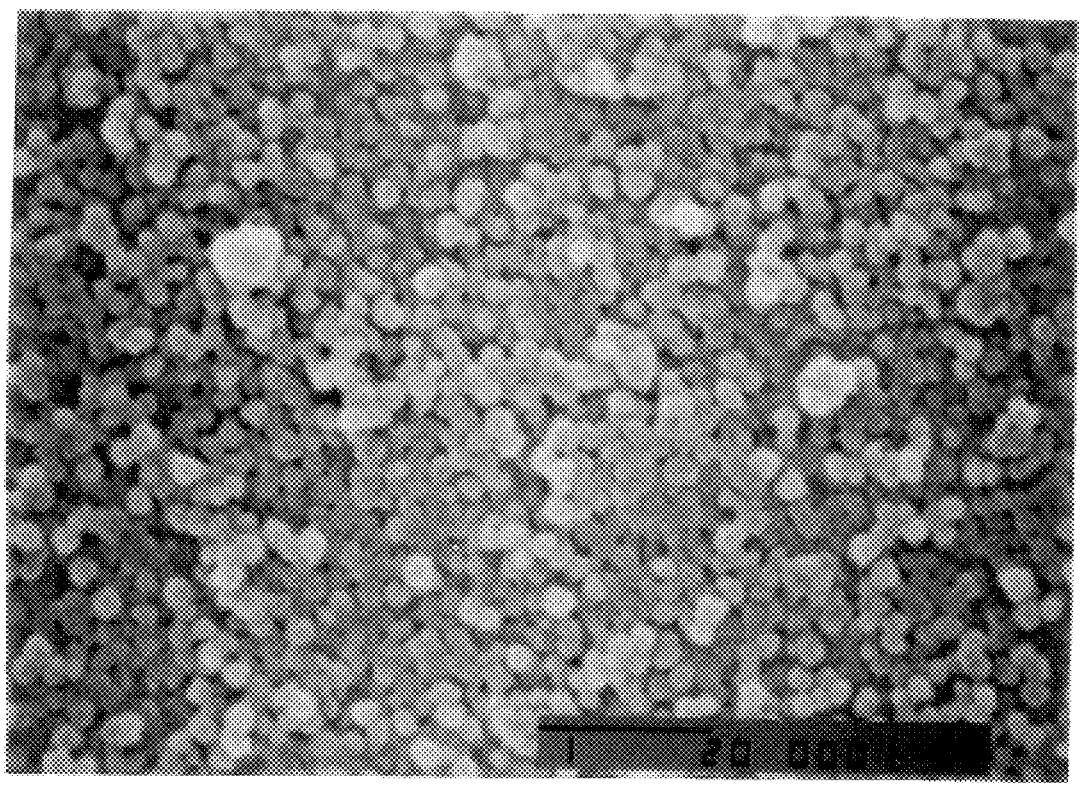
FIG. 1 is a photograph taken by scanning electron microscope showing a crystallized glass of the sample 1.

Hereinafter, the present invention will be explained in detail with reference to the drawings.

In the present invention, it was found that, when the parent glass having a predetermined chemical composition was crystallized at a standard crystallized temperature and at a temperature varying within ±10° C. with respect to the standard crystallized temperature so as to obtain the crystallized glass having the main crystal phase and the chemical composition mentioned above, a difference (range of thermal expansion coefficient: Δα) between maximum value and minimum value on the thermal expansion coefficient of the thus obtained crystallized glass could be controlled to smaller than $10 \times 10^{-7}$/K. In this manner, according to the invention, even if the crystallized temperature is varied, a variation of thermal expansion coefficient becomes small. Therefore, the present invention can be contributed to a mass production of the crystallized glass, and a quality of the crystallized glass can be stabilized. Moreover, since a fine crystal can be obtained, it is possible to make a surface roughness after a precise polishing smaller, so that a low gride height of the magnetic disc drive can be achieved.

In a crystallized glass of LAS($LiO_2$—$Al_2O_3$—$SiO_2$) series, when a crystallized glass having a larger thermal expansion coefficient at 25° C.~100° C. is designed, it is thought that, in a crystallized glass having lithium disilicate phase as a main crystal, tridymite phase having a phase transition temperature of 140° C. and cristobalite phase having a phase transition temperature of 270° C. are precipitated as a subcrystal. These phases constituting the sub phase show a large thermal expansion coefficient on not only their α-phase but also β-phase. Moreover, since they show a phase transition, it is possible to make their thermal expansion coefficients to $(80~100) \times 10^{-7}$/K. However, thermal expansion coefficients at −50° C.~70° C. of these crystallized glass in which sub crystals are precipitated are not lowered to $(70~90) \times 10^{-7}$/K at most.

On the other hand, as shown in a page 86 of "Glass-Ceramics Material" (Z.Strnad, ELSEVIER, 1985), there is known a crystallized glass in which α-quartz is precipitated from LAS series glass. The α-quartz has a phase transition temperature of 573° C., but, if a part of Si is substituted by Al and Li, its phase transition temperature is lowered in proportion to the substituted amount, so that a thermal expansion coefficient at near room temperature becomes large.

In the present invention, it is possible to make a thermal expansion coefficient at −50° C.~70° C. to $(90~130) \times 10^{-7}$/K by precipitating a-quartz, in which a part of Si is substituted by Al and Li, and lithium disilicate as a main crystal. In this case, it is confirmed that, when the parent glass having a predetermined chemical composition mentioned above is crystallized at a standard crystallized temperature and at a temperature varying within ±10° C. with respect to the standard crystallized temperature so as to obtain the crystallized glass having the main crystal phase and the chemical composition mentioned above, a difference (range of thermal expansion coefficient: Δα) between maximum value and minimum value on the thermal expansion coefficient of the thus obtained crystallized glass can be controlled to smaller than $10 \times 10^{-7}$/K by adding 0.7~6 wt % of at least one kind of $Nb_2O_5$, $SnO_2$, $MoO_3$ in the predetermined main chemical composition.

Among three kinds of oxides, a magnitude of contribution to the thermal expansion coefficient stability with respect to the crystallized temperature is $Nb_2O_5$ at most, $SnO_2$ at second and $MoO_3$ at last. Moreover, it is possible to make crystal particles to fine crystals having a diameter of 0.1~0.3 μm and a precipitated state, by adding at least one kind of $Nb_2O_5$, $SnO_2$, $MoO_3$ in the predetermined main chemical composition.

In the present invention, if an amount of $SiO_2$ is not larger than 70 wt %, $SiO_2$ crystal particles become larger, and, if an amount of $SiO_2$ is not smaller than 80 wt %, it is difficult to melt a glass. If an amount of $Al_2O_3$ is not larger than 5 wt %, α-quartz is not precipitated and a thermal expansion coefficient of the crystallized glass is lowered. If an amount of $Al_2O_3$ is not smaller than 9 wt %, a glass melting property is deteriorated. If an amount of $Li_2O$ is not larger than 7 wt %, predetermined crystals are not precipitated and it is difficult to melt a glass. If an amount of $Li_2O$ is not smaller than 10 wt %, crystal particles become larger. If an amount of $P_2O_5$ is not larger than 1 wt %, predetermined particles are not precipitated. If an amount of $P_2O_5$ is not smaller than 3 wt %, a glass devitrifying property is deteriorated and crystal particles become larger.

If amounts of $Nb_2O_5$, $SnO_2$, $MoO_3$ are small, a thermal expansion coefficient stability with respect to a variation of crystallized temperature cannot be obtained. If an amount of $Nb_2O_5$ is not smaller than 6 wt %, crystal particles become larger. If an amount of $SnO_2$ is not smaller than 4 wt %, a different phase is precipitated. If an amount of $MoO_3$ is not smaller than 3 wt %, a different phase is precipitated.

If $K_2O$ is added, a melting property of the parent glass is improved. However, if an amount of $K_2O$ is not smaller than 3 wt %, it is difficult to precipitate α-quartz and crystal particles become larger. If BaO is added, a melting property of the parent glass is improved. However, if an amount of BaO is not smaller than 4 wt %, crystals are not precipitated. If ZnO is added, a melting property of the parent glass is improved. However, if an amount of ZnO is not smaller than 4 wt %, a devitrifying property is deteriorated. If $Sb_2O_3$ is added, a refining property is improved. However, the refining property is sufficient if an amount of $Sb_2O$ is smaller than 1 wt %. If $ZrO_2$ is added, crystals become fine. However, if an amount of $ZrO_2$ is not smaller than 6 wt %, α-quartz is not precipitated.

From the view point mentioned above, the following chemical composition is preferred in the present invention;

71 (especially 72.5) wt % $\leq SiO_2 \leq$ 78(especially 76.5) wt %,

5(especially 5.5) wt % $\leq Al_2O_3 \leq$ 9(especially 8.5) wt %

7.5(especially 8.0) wt % $\leq Li_2O \leq$ 10(especially 9.5) wt %

1 wt % $\leq P_2O_5 \leq$ 2.5 wt %

0 wt % $\leq K_2O \leq$ 3(especially 2.5) wt %

0 wt % $\leq CaO \leq$ 3(especially 2.0) wt %

0 wt % $\leq BaO \leq$ 4(especially 3.0) wt %

0 wt % $\leq ZnO \leq$ 4(especially 3.0) wt %

0.1 wt % $\leq Sb_2O_3 \leq$ 0.5 wt %

0.5(especially 1.0) wt % $\leq ZrO_2 \leq$ 5(especially 4.0) wt %

0.7(especially 1.0) wt % $\leq Nb_2O_5 \leq$ 6(especially 4.0) wt %

0(especially 0.5) wt % $\leq SnO_2 \leq$ 4(especially 2.0) wt %

0(especially 0.5) wt % $\leq MoO_3 \leq$ 3(especially 2.0) wt %

0.7(especially 1.0) wt % $\leq (Nb_2O_5+SnO_2+MoO_3) \leq$ 6 (especially 4.0) wt %.

As a crystallized condition, a glass transition temperature Tg of the parent glass is about 510° C., but the crystallization is performed by subjecting the parent glass to a heat treatment at 570° C.~640° C., preferably at 600° C.~640° C. for 2~10 hours so as to perform a nucleus generation and then subjecting the parent glass to a heat treatment at 670° C.~750° C. for 2~10 hours, preferably at 690° C.~740° C. for 2~5 hours so as to crystallize the parent glass. In this manner, crystal particle sizes can be made fine, and thus a surface roughness after a precise polishing becomes small.

If a crystallized temperature is greater than 760° C., a generation of α-quartz is decreased and a generation of β-spodumene is increased. The generation of β-spodumene is not preferred since it has a large precipitated particle and thus a surface roughness after a precise polishing becomes large. Therefore, it is desired to control a crystallization percentage of β-spodumene to smaller than 20 wt % preferably smaller than 10 wt %. On the other hand, if the crystallized temperature is smaller than 640° C., a generation of petalite constructed by a low thermal expansion crystal is increased, and thus it is difficult to make a thermal expansion coefficient to larger than $90 \times 10^{-7}$/ K. Therefore, the crystallization percentage of petalite is controlled to smaller than 25 wt % preferably smaller than 15 wt %.

In order to make the crystal particle size smaller, a suitable value of the nucleus generation temperature exists. It is possible to make the crystal particle size smaller if the crystallization is performed under a condition such that the nucleus generation temperature is controlled at 600° C.~640° C. and a maintaining time is controlled for 2~10 hours.

In the present invention, a phrase that lithium disilicate and α-quartz are a main crystal in the crystallized glass means that crystallization percentages of them are at least two times larger than that of the other crystal phase. It is confirmed that the crystallization percentages of respective crystals in the crystallized glass according to the invention are in the following range. In this case, when measuring the crystallization percentages, use is made of an X-ray diffraction apparatus with X-ray output of 50 kV and 300 mA (RINT2500 produced by Rigaku Denki K.K.). Moreover, Ge(111) curved type monochromator is provided at an incident side of an optical system of the X-ray diffraction apparatus. Then, the crystallization percentages are measured by using Rietveld analysis (soft name to be used: RIERAN) in which alumina is used as an inner standard sample.

| (Main crystal) | |
|---|---|
| a-quartz | 34~44 wt % |
| lithium disilicate | 17~27 wt % |
| (Sub crystal) | |
| petalite | 5~15 wt % |
| spodumene | 0~10 wt % |
| (residudal glass) | 18~28 wt % |

When producing the parent glass, respective raw materials including respective metal atoms mentioned above are mixed to obtain a mixture having the weight percentages mentioned above, and the thus obtained mixture is melted. As the raw materials, use may be made of oxide, carbonate, nitrate, phosphate, and hydroxide of respective metal atoms. Moreover, as an atmosphere used when the heat treatment is subjected to the parent glass to perform its crystallization, use may be made of air atmosphere, reduction atmosphere, vapor atmosphere, pressurized atmosphere and so on.

In the step of precisely polishing materials made of the crystallized glass mentioned above by using polishing powders, use may be made of the known precise polishing methods such as lapping, polishing and so on, so as to produce a substrate for a magnetic disc. Moreover, underlying layer, magnetic layer, protect layer and so on are formed on a major plane of the substrate for the magnetic disc according to the invention, and further lubricant can be applied on the protect layer.

Hereinafter, actual experiments will be explained.
(Production of Glass)

Compounds including respective metals were mixed so as to provide mixtures having weight ratios of metal oxides as shown in the following Table 1~Table 4. Then, 250 g of the mixture was supplied in a Pt crucible having a volume of 200cc and was melted in the Pt crucible by performing a heat treatment at 1400° C. for 5.5 hours. A temperature of a furnace used for the heat treatment was lowered to 1350° C. and was maintained at 1350° C. for 1 hour. After that, the melted glass was flowed into a carbon mold so as to perform a forming. Then, the formed glass was subjected to an annealing at 500° C. for 1 hour, and then gradually cooled. In this manner, a parent glass having a disc shape was obtained.

From the parent glass, plate-shaped specimens having sizes of 15×15×0.85 (thickness) mm, 22×22×0.85 (thickness) mm, 5×30×0.85 (thickness) mm and 10×45×1.2 (thickness) mm were cut out. Both major planes of these plate-shaped specimens were subjected to a fine working by using a whetstone of #400.
(Measurement of Glass Transition Temperature)

The specimen having a size of 5×30×0.85 (thickness) mm was cut out to obtain the specimen having a length of 20 mm. Then, a thermal expansion coefficient of the thus obtained specimen was measured at a range of room temperature (RT)~900° C. by using a dilatometer (TD5010 produced by Mac-Science K.K.). The thermal expansion coefficient measuring apparatus mentioned above had an auto-stop function when a glass was yielded. A glass transition temperature was assumed as a temperature at inflexion point of a thermal expansion curve of the glass.
(Nucleus Generation and Crystallization)

Respective specimens were crystallized in nitrogen atmosphere under such a condition that they were sandwiched by carbon plates having a thickness of 5 mm. During the crystallization, a temperature was ascended from RT to respective nucleus generation temperatures at a temperature ascending rate of 200° C./hour, maintained at respective nucleus generation temperatures for 2~5 hours, further ascended to respective crystallization temperatures at a temperature ascending rate of 100° C./hour, maintained at respective crystallization temperatures for 2~5 hours, and descended to RT at a temperature descending rate of 200° C./hour.
(Identification of Crystal Phase)

An X-ray diffraction apparatus using Kα line of copper ("Geiger flex" produced by Rigaku Denki K.K., tube voltage of 30 kV, tube current of 20 mA) was used to identify the crystal phases formed at the surface of the crystallized plate specimens having a size of 15×15 mm. In this case, a scanning angle was set to 2θ=19~30°. As a result, in all the specimens, α-quartz (indicated by "a-Qu" in respective Tables: chemical formula "$SiO_2$") and lithium disilicate (indicated by "L2S" in respective Tables: chemical formula "$Li_2Si_2O_5$") were precipitated as a main crystal phase. Moreover, in a part of the specimens, crystals such as spodumene (indicated by "Sp" in respective Tables: chemical formula "$Li_2Al_2Si_8O_{20}$") and cristobalite (indicated by "Cri" in respective Tables: chemical formula "$SiO_2$") were observed as a sub crystal phase.
(Measurement of Thermal Expansion Coefficient)

The crystallized specimens having a size of 5×30 mm were cut out to obtain test specimens; having a length of 20 mm. Thermal expansions of the test specimens were; measured at a range of −75°~110° by using a dilatometer (TD5030S produced by Mac-Science K.K.). Then, thermal expansion coefficients α at −50° C.~70° C. were calculated. A term "Δα" used in the following Tables 1~4 show α range of the specimens which are crystallized at the crystallized temperatures shown in respective Tables and at a temperature varying ±10° C. with respect to the crystallized temperature. Moreover, in this case, a term "α" indicates a thermal expansion coefficient of the specimens crystallized at the crystallized temperatures shown in respective Tables.

(Measurement of Ra at Smoothened Surface after Precise Polishing Treatment)

The plate specimens having a size of 15×15 mm, to which the crystal phase identification were finished, were subjected to a precise polishing by using #700 whetstone to obtain the specimens having a thickness of 0.645 mm. Then, the specimen were further subjected to a first polishing using grinding particles of cerium oxide having a particle size of 1.0 μm by means of a double-sided polishing machine to obtain the specimens having a thickness of 0.635 mm. Further, the specimens were subjected to a second polishing using grinding particles of cerium oxide having a particle size of 0.02 μm to obtain a precisely polished bodies having a thickness of 0.635 mm.

A center line average roughness (Ra) of the precisely polished bodies was measured at a tapping mode of atomic force microscope (M5 produced by PSI K.K.) which used a cantilever made of silicon (resonance frequency: 300 kHz).

(Observation of Microstructure)

The precisely polished bodies were subjected to an etching treatment in 5% hydrofluoric acid aqueous solution for 3 minutes. After that, sizes of crystals at the etched surface of the precisely polished bodies were observed by a scanning electron microscope.

(Measurement of Bending Strength)

The crystallized plate specimens having a size of 22×22 mm were subjected to a precise polishing as is the same as the specimens having a size of 15×15 mm. Then, the specimens were cut out to obtain the specimens having a size of 2×20 mm. After that, a four point bending test was performed with respect to the thus cut out specimens under such a condition of lower span: 15 mm, upper span: 5 mm and cross head speed: 0.5 mm/min to obtain bending strengths.

(Measurement of Young's Modulus)

The crystallized plate specimens having a size of 10×45 mm were subjected to a precise polishing as is the same as the specimens having a size of 15×15 mm. Then, the specimens were cut out to obtain the specimens having a size of 4×40 mm, and a strain gauge was adhered on the thus cut out specimens. After that, a four point bending test was performed with respect to the thus cut out specimens with the strain gauge under such a condition of lower span: 30 mm, upper span: 10 mm and cross head speed: 0.5 mm/min to obtain a relation between stress and strain. Then, Young's modulus of the specimens was calculated on the basis of the thus obtained relation between stress and strain.

(Measurement of Vickers Hardness)

Vickers hardness of the precisely polished specimens was measured under a press pressure of 1 kgf by using Micro-Vickers hardness measuring apparatus.

TABLE 1

| Example | 1 | 2 | 3 | 4 | 5 |
|---|---|---|---|---|---|
| $SiO_2$ | 73.50 | 73.50 | 73.50 | 73.50 | 73.50 |
| $Al_2O_3$ | 7.00 | 7.00 | 7.00 | 7.00 | 7.00 |
| $Li_2O$ | 8.60 | 8.60 | 8.60 | 8.60 | 8.60 |
| $P_2O_5$ | 1.90 | 1.90 | 1.90 | 1.90 | 1.90 |
| $K_2O$ | 2.00 | 2.00 | 2.00 | 2.00 | 2.00 |
| CaO | 1.00 | 1.00 | 1.00 | 1.00 | 1.00 |
| BaO | 0.50 | 0.50 | 0.50 | 0.50 | 0.50 |
| ZnO | 1.00 | 1.00 | 1.00 | 1.00 | 1.00 |
| $Sb_2O_3$ | 0.50 | 0.50 | 0.50 | 0.50 | 0.50 |
| $ZrO_2$ | 3.00 | 1.00 | — | 3.00 | 3.00 |
| $Nb_2O_5$ | 1.00 | 3.00 | 4.00 | — | — |
|  | — | — | — | $SnO_2$: 1.00 | $MoO_3$: 1.00 |
| Nucleus generation temperature (° C.) | 610 | 610 | 620 | 610 | 620 |
| Crystallization temperature (° C.) | 700 | 700 | 690 | 720 | 710 |
| Main crystal phase | α-Qu. | α-Qu. | α-Qu. | α-Qu. | α-Qu. |
|  | L2S | L2S | L2S | L2S | L2S |
| Sub crystal phase | — | — | — | Cri. | Cri. |
| α ($\times 10^{-7}$/K) | 110 | 115 | 112 | 97 | 97 |
| Δα ($\times 10^{-7}$/K) | 3 | 3 | 2 | 6 | 7 |
| Particle size (μm) | 0.17 | 0.25 | 0.26 | 0.24 | 0.25 |
| Ra (Å) | 3 | 5 | 6 | 6 | 6 |

TABLE 2

| Comparative Example | 1 | 2 | 3 | 4 | 5 | 6 | 7 |
|---|---|---|---|---|---|---|---|
| $SiO_2$ | 73.30 | 74.67 | 70.00 | 71.20 | 73.50 | 72.73 | 72.73 |
| $Al_2O_3$ | 7.00 | 7.83 | 6.20 | 6.78 | 7.00 | 6.93 | 6.93 |
| $Li_2O$ | 8.60 | 9.65 | 8.40 | 8.33 | 8.60 | 8.51 | 8.51 |
| $P_2O_5$ | 1.90 | 1.87 | 1.70 | 1.84 | 1.90 | 1.88 | 1.88 |
| $K_2O$ | 2.00 | 1.97 | — | 1.94 | 2.00 | 1.98 | 1.98 |
| CaO | 1.00 | — | 2.00 | 0.97 | 1.00 | 0.99 | 0.99 |
| BaO | 0.50 | — | 1.50 | 0.48 | 0.50 | 0.49 | 0.49 |
| ZnO | 1.00 | 0.49 | 2.00 | 0.97 | 1.00 | 0.99 | 0.99 |
| $Sb_2O_3$ | 0.50 | 0.39 | 1.00 | 0.48 | 0.50 | 0.49 | 0.49 |
| $ZrO_2$ | 4.20 | 2.33 | 4.50 | — | 3.00 | — | — |
| $Nb_2O_5$ | — | — | — | 7.00 | — | — | — |
|  | — | MgO: 0.80 | $TiO_2$: 2.7 | — | $Ta_2O_5$: 1.00 | $SnO_2$: 5.00 | $MoO_3$: 5.00 |
| Nucleus generation temperature (° C.) | 610 | 610 | 610 | 610 | 600 | 600 | 600 |

TABLE 2-continued

| Comparative Example | 1 | 2 | 3 | 4 | 5 | 6 | 7 |
|---|---|---|---|---|---|---|---|
| Crystallization temperature (° C.) | 700 | 690 | 700 | 720 | 690 | 720 | 690 |
| Main crystal phase | Peta. L2S α-Qu. | α-Qu. L2S | α-Qu. L2S | α-Qu. L2S | Peta. L2S α-Qu. | Peta. L2S | Peta. L2S |
| Sub crystal phase | Peta. | Peta. | Peta. | — | — | α-Qu. | α-Qu. |
| α (×10$^{-7}$/K) | 95 | 92 | 89 | 83 | 81 | 78 | 84 |
| Δα (×10$^{-7}$/K) | 24 | 18 | 27 | 4 | 12 | 6 | 12 |
| Particle size (μm) | 0.18 | 0.20 | 0.35 | 0.48 | 0.22 | 0.22 | 0.35 |
| Ra (Å) | 5 | 5 | 8 | 17 | 6 | 5 | 14 |

TABLE 3

| Example | 6 | 7 | 8 | 9 | 10 | 11 | 12 |
|---|---|---|---|---|---|---|---|
| $SiO_2$ | 74.25 | 73.35 | 73.30 | 74.04 | 77.08 | 72.21 | 74.50 |
| $Al_2O_3$ | 7.07 | 7.01 | 7.04 | 6.77 | 5.26 | 8.60 | 6.00 |
| $Li_2O$ | 8.69 | 8.62 | 8.64 | 8.59 | 9.72 | 8.51 | 7.70 |
| $P_2O_5$ | 1.92 | 2.20 | 1.91 | 1.62 | 1.90 | 1.88 | 1.70 |
| $K_2O$ | 1.00 | 1.50 | 2.01 | 1.82 | 2.84 | 1.78 | 1.50 |
| CaO | 1.01 | 1.50 | 1.01 | — | — | 0.49 | 0.90 |
| BaO | 0.51 | 0.30 | — | 1.31 | — | 0.49 | 0.50 |
| ZnO | 1.01 | 1.00 | 1.01 | 1.41 | — | 0.99 | 1.00 |
| $Sb_2O_3$ | 0.51 | 0.50 | 0.50 | 0.41 | 0.20 | 0.49 | 0.40 |
| $ZrO_2$ | 3.03 | 3.01 | 1.50 | — | 1.00 | 2.57 | 0.80 |
| $Nb_2O_5$ | 1.01 | 1.00 | 3.02 | 4.04 | 2.00 | 1.99 | 5.00 |
| Nucleus generation temperature (° C.) | 620 | 620 | 610 | 610 | 600 | 590 | 610 |
| Crystallization temperature (° C.) | 700 | 710 | 710 | 720 | 680 | 740 | 720 |
| Main crystal phase | α-Qu. L2S | α-Qu. L2S | α-Qu. L2S | α-Qu. L2S | α-Qu. L2S | α-Qu. L2S | α-Qu. L2S |
| Sub crystal phase | — | — | — | — | — | — | — |
| α (×10$^{-7}$/K) | 120 | 102 | 110 | 116 | 95 | 117 | 97 |
| Δα (×10$^{-7}$/K) | 2 | 2 | 2 | 5 | 7 | 4 | 7 |
| Particle size (μm) | 0.13 | 0.19 | 0.21 | 0.22 | 0.29 | 0.28 | 0.26 |
| Ra (Å) | 2 | 4 | 5 | 6 | 7 | 6 | 6 |

TABLE 4

| Comparative Example | 8 | 9 | 10 | 11 |
|---|---|---|---|---|
| $SiO_2$ | 81.50 | 74.88 | 67.70 | 73.70 |
| $Al_2O_3$ | 4.00 | 5.16 | 11.20 | 7.50 |
| $Li_2O$ | 8.10 | 11.00 | 8.80 | 6.00 |
| $P_2O_5$ | 1.90 | 1.90 | 1.70 | — |
| $K_2O$ | 1.50 | 2.56 | 1.30 | 2.00 |
| CaO | 0.50 | — | 1.80 | 2.00 |
| BaO | 0.50 | — | 1.00 | 1.30 |
| ZnO | 0.50 | — | 1.50 | 1.00 |
| $Sb_2O_3$ | 0.50 | 0.50 | 1.00 | 0.50 |
| $ZrO_2$ | — | — | 2.00 | 4.00 |
| $Nb_2O_5$ | 1.00 | 4.00 | 2.00 | 2.00 |
| Nucleus generation temperature (° C.) | 600 | 610 | 600 | 580 |
| Crystallization temperature (° C.) | 690 | 700 | 730 | 730 |
| Main crystal phase | Cri. L2S — | L2S Peta. — | L2S Sp. α-Qu. | Cri. L2S — |
| Sub crystal phase | α-Qu | α-Qu | — | Sp. |
| α (×10$^{-7}$/K) | 83 | 78 | 85 | 87 |
| Δα (×10$^{-7}$/K) | 9 | 7 | 8 | 3 |
| Particle size (μm) | 0.32 | 0.52 | 0.40 | 0.43 |
| Ra (Å) | 8 | 25 | 15 | 18 |

From the results shown in Tables 1–4, the followings are understood.

EXAMPLES 1–3

Comparative Examples 1–4
(Effects of $Nb_2O_5$ addition))

In the examples 1–3 according to the invention, a thermal expansion coefficient was in a range of $(110\sim120)\times10^{-7}$/K and the Δα was about $(2\sim3)\times10^{-7}$/K. The particle size was smaller than 0.3 μm at all the examples, and became smaller corresponding to a decrease of niobium oxide amount. Moreover, the Ra was smaller than 7 angstroms, and the same tendency as that of the particle size was detected.

In the comparative example 1, $Nb_2O_5$ was not included, and thus α-quartz was not precipitated as a main crystal. In the comparative examples 2 and 3, MgO and $TiO_2$ were substituted for $Nb_2O_5$, but the Δα was not made smaller. In the comparative example 4, when an amount of $Nb_2O_5$ was 7 wt %, the α was small as $83\times10^{-7}$/K, but the particle size was larger. From the results mentioned above, it was understood that an amount of $Nb_2O_5$ should be controlled to smaller than 6 wt %, preferably to 1–4 wt %.

Material properties of the example 1 according to the invention are summarized as follows;

| | |
|---|---|
| Crystal phase | α-quartz, lithium disilicate |
| Crystal particle size | 0.17 μm |
| Density | 2.54 g/cm$^3$ |
| Young's modulus | 90 GPa |
| E/ρ | 35.4 |
| Bending strength | 180 MPa |
| Vickers hardness | 670 Hv |
| Thermal expansion coefficient at −50° C.~70° C. | 110 × 10$^{-7}$/K |
| Thermal expansion coefficient at 25° C.~100° C. | 137 × 10$^{-7}$/K |

Figure 2:
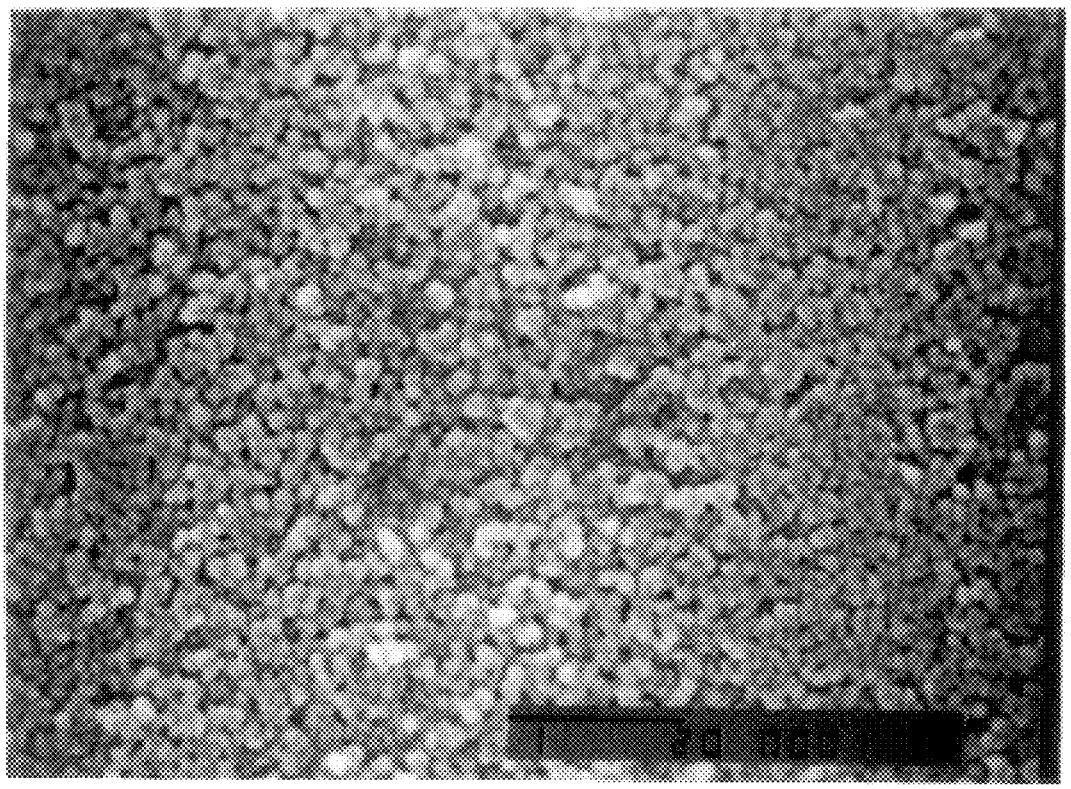
FIG. 2 is a photograph taken by scanning electron microscope illustrating a crystallized glass of the sample 6.

FIGS. 1 and 2 are photographs taken by the scanning electron microscope of the example 1 and the example 6 respectively.

EXAMPLES 4 and 5,

Comparative Examples 5–7
(Effects of SnO$_3$, MoO$_3$ addition))

In the example 4, when an amount of SnO$_2$ was 1 wt %, the α was 97×10$^{-7}$/K and the Δα was 6×10$^{-7}$/K. In this case, the particle size was 0.24 μm and the Ra was 6 angstroms. On the other hand, in the comparative example 6, when an amount of SnO$_2$ was 5 wt %, α-quartz was not obtained as a main crystal and the α was smaller than 90×10$^{-7}$/K.

In the example 5, when an amount of MoO$_3$ was 1 wt %, the a was 97×10$^{-7}$/K and the a was 7×10$^{-7}$/K. On the other hand, in the comparative example 7, when an amount of MoO$_3$ was 5 wt %, α-quartz was not obtained as a main crystal, the α was smaller than 90×10$^{-7}$/K and the particle size was larger as 0.35 μm. In the comparative example 5, if tantalum oxide was added, the Δα was larger as 12×10$^{-7}$/K and improvements were not detected. Moreover, even if vanadium oxide and chromium oxide were added, no improvement was detected in both cases. From the results mentioned above, it was understood that an amount of SnO$_2$ should be controlled to 0~4 wt % and an amount of MoO$_3$ should be controlled to 0~3 wt %. The amount of MoO$_3$ mentioned above was preferably from a view point of devitrifying property. Moreover, it was further preferred that an amount of SnO$_2$ was 0~2 wt % and an amount of MoO$_3$ was 0~2 wt %.

EXAMPLES 6–12,

Comparative Examples 8–11
(Effects of the Other Components))

Effects of the components other than Nb$_2$O$_5$ were investigated. From the comparative examples 8 and 10, it was understood that an amount of SiO$_2$ should be 70.0~80.0 wt %. From the examples 6–9 and 10–11, it was preferred to control an amount of SiO$_2$ to 72.5~76.5 wt %. From the comparative examples 8 and 10, it was understood that an amount of Al$_2$O$_3$ should be 5.0~10 wt %. From the examples 6–9 and 10–11, it was preferred to control an amount of Al$_2$O$_3$ to 5.5~8.5 wt %. From the comparative examples 9 and 11, it was understood that an amount of LiO$_2$ should be 7~10.0 wt %. From the examples 6–9 and 10, 12, it was preferred to control an amount of LiO$_2$ to 8.0~9.5 wt %. From the example 7 and the comparative example 11, it was understood that an amount of P$_2$O$_5$ should be 1.0~3.0 wt %, preferably 1.0~2.5 wt %.

Then, the another specimens were produced under the other conditions shown in Table 5 and Table 6, and the same tests mentioned above were performed with respect to the thus produced specimens. In this case, examples 13–16 and comparative examples 12–15 have the same parent glass chemical composition as that of the example 1, and the nucleus generation temperature and the crystallization temperature were changed. The measured results of respective examples and comparative examples are shown in Table 5 and Table 6.

TABLE 5

| Example | 13 | 14 | 15 | 16 |
|---|---|---|---|---|
| Nucleus generation temperature (° C.) | 630, 5 h | 640, 5 h | 600, 5 h | 630 10 h |
| Crystallization temperature (° C.) | 700, 5 h | 710, 5 h | 730, 5 h | 710, 5 h |
| Main crystal phase | α-Qu. L2S | α-Qu. L2S | α-Qu. L2S | α-Qu. L2S |
| Sub crystal phase | — | — | — | — |
| α (× 10$^{-7}$/K) | 120 | 121 | 117 | 123 |
| Particle size (μm) | 0.15 | 0.16 | 0.18 | 0.14 |
| Ra (Å) | 3 | 3 | 4 | 2 |

TABLE 6

| Comparative Example | 12 | 13 | 14 | 15 |
|---|---|---|---|---|
| Nucleus generation temperature (° C.) | 600, 5 h | 600, 5 h | 550, 5 h | 660, 5 h |
| Crystallization temperature (° C.) | 770, 5 h | 650, 5 h | 740, 5 h | 730, 5 h |
| Main crystal phase | α-Qu. L2S Sp. | Peta. L2S α-Qu. | α-Qu. L2S | α-Qu. L2S |
| Sub crystal phase | — | — | — | — |
| α (× 10$^{-7}$/K) | 120 | 79 | 102 | 117 |
| Particle size (μm) | 0.42 | 0.15 | 0.31 | 0.33 |
| Ra (Å) | 15 | 4 | 8 | 8 |

From the examples 1, 13, 14 and the comparative examples 14, 15, it was understood that the nucleus generation temperature was contributed to the particle size and the Ra. From this point of view, it was preferred that the nucleus generation temperature was 570~640° C. preferably 600~640° C. From the examples 1, 15 and the comparative examples 12, 13, it was understood that the crystal phase was varied corresponding to the crystallization temperature and thus the crystallization temperature was contributed to the α, the particle size and the Ra. From this point of view, it was preferred that the crystallization temperature was 670~750° C. preferably 690~740° C.

Figure 3:
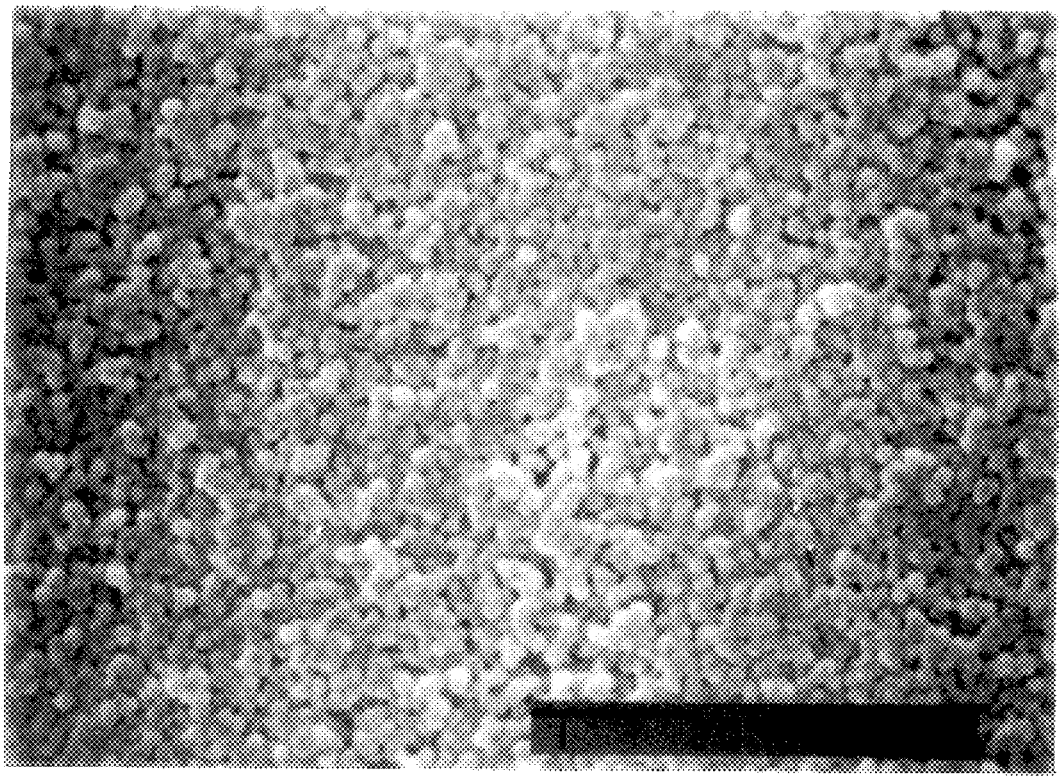
FIG. 3 is a photograph taken by scanning electron microscope depicting a crystallized glass of the sample 16.

From the examples 13 and 16, the microstructure was varied corresponding to the nucleus generation time, and fine particles were obtained when performing the nucleus generation for 10 hours. For reference, FIG. 3 is a photograph taken by the scanning electron microscope of the example 16.

As mentioned above, according to the invention, in the crystallized glass having main crystals of lithium disilicate and α-quartz, a thermal expansion coefficient at −50~70° C. can be controlled to (90~130)×10$^{-7}$/K, a variation of thermal expansion coefficient with respect to the crystallized temperature can be made small, and crystals can be made fine.

What is claimed is:

1. A crystallized glass, which has a main crystal phase of α-quartz (SiO$_2$) and lithium disilicate (Li$_2$O·2SiO$_2$) and has a thermal expansion coefficient of (90~130)×10$^{-7}$/K at −50° C.~70 ° C., comprising a following chemical composition; 70 wt %≦SiO$_2$≦80 wt %, 5 wt %≦Al$_2$O$_3$≦9 wt %, 7 wt %≦Li$_2$O<10 wt %, 1 wt %≦P$_2$O$_5$≦3 wt %, 0 wt %≦K$_2$O≦3 wt %, 0 wt %≦CaO≦3 wt %, 0 wt %≦BaO≦4 wt %, 0 wt %≦ZnO≦4 wt %, 0 wt %≦Sb$_2$O$_3$≦1 wt %, 0 wt % $\leq ZrO_2 \leq$ 6 wt %, 0 wt % $\leq Nb_2O_5 \leq$ 6 wt %, 0 wt % $\leq SnO_2 \leq$ 4 wt %, 0 wt % $\leq MoO_3 \leq$ 3 wt %, 0.7 wt % $\leq (Nb_2O_5+SnO_2+MoO_3) \leq$ 6 wt %.

2. The crystallized glass according to claim 1, wherein the chemical composition is as follows; 71 wt % $\leq SiO_2 \leq$ 78 wt %, 5 wt % $\leq Al_2O_3 \leq$ 9 wt %, 7.5 wt % $\leq Li_2O<$10 wt %, 1 wt % $\leq P_2O_5 \leq$ 2.5 wt %, 0 wt % $\leq K_2O \leq$ 3 wt %, 0 wt % $\leq CaO \leq$ 3 wt %, 0 wt % $\leq BaO \leq$ 4 wt %, 0 wt % $\leq ZnO \leq$ 4 wt %, 0.1 wt % $\leq Sb_2O_3 \leq$ 0.5 wt %, 0.5 wt % $\leq ZrO_2 \leq$ 5 wt %, 0.7 wt % $\leq Nb_2O_5 \leq$ 6 wt %, 0 wt % $\leq SnO_2 \leq$ 4 wt %, 0 wt % $\leq MoO_3 \leq$ 3 wt %, 0.7 wt % $\leq (Nb_2O_5+SnO_2+MoO_3) \leq$ 6 wt %.

3. The crystallized glass according to claim 1, wherein crystal particle sizes are 0.1~0.3 μm.

4. A substrate for magnetic disc, made of the crystallized glass set forth in claim 1, comprising a smoothened surface having a center line average roughness (Ra) of smaller than 7 angstrom.

5. A magnetic disc comprising the substrate for magnetic disc set forth in claim 4, a underlying layer formed on the smoothened surface of the substrate for magnetic disc, and a metallic magnetic layer formed on the underlying layer.

6. A method of producing a crystallized glass comprising the steps of; preparing a parent glass having the following chemical composition, subjecting the parent glass to a heat treatment at 570° C.~640° C. so as to perform a nucleus generation, and subjecting the parent glass to a heat treatment at 670° C.~750° C. so as to crystallize the parent glass; 70 wt % $\leq SiO_2$ 23 80 wt %, 5 wt % $\leq Al_2O_3 \leq$ 9 wt %, 7 wt % $\leq Li_2O<$10 wt %, 1 wt % $\leq P_2O_5 \leq$ 3 wt %, 0 wt % $\leq K_2O \leq$ 3 wt %, 0 wt % $\leq CaO \leq$ 3 wt %, 0 wt % $\leq BaO \leq$ 4 wt %, 0 wt % $\leq ZnO \leq$ 4 wt %, 0 wt % $\leq Sb_2O_3 \leq$ 1 wt %, 0 wt % $\leq ZrO_2 \leq$ 6 wt %, 0 wt % $\leq Nb_2O_5 \leq$ 6 wt %, 0 wt % $\leq SnO_2 \leq$ 4 wt %, 0 wt % $\leq MoO_3 \leq$ 3 wt %, 0.7 wt % $\leq (Nb_2O_5+SnO_2+MoO_3) \leq$ 6 wt %.

* * * * *